Dec. 14, 1954     J. ROSE     2,696,626
APPARATUS FOR CLEANING LABORATORY GLASS SLIDES
Filed April 7, 1952
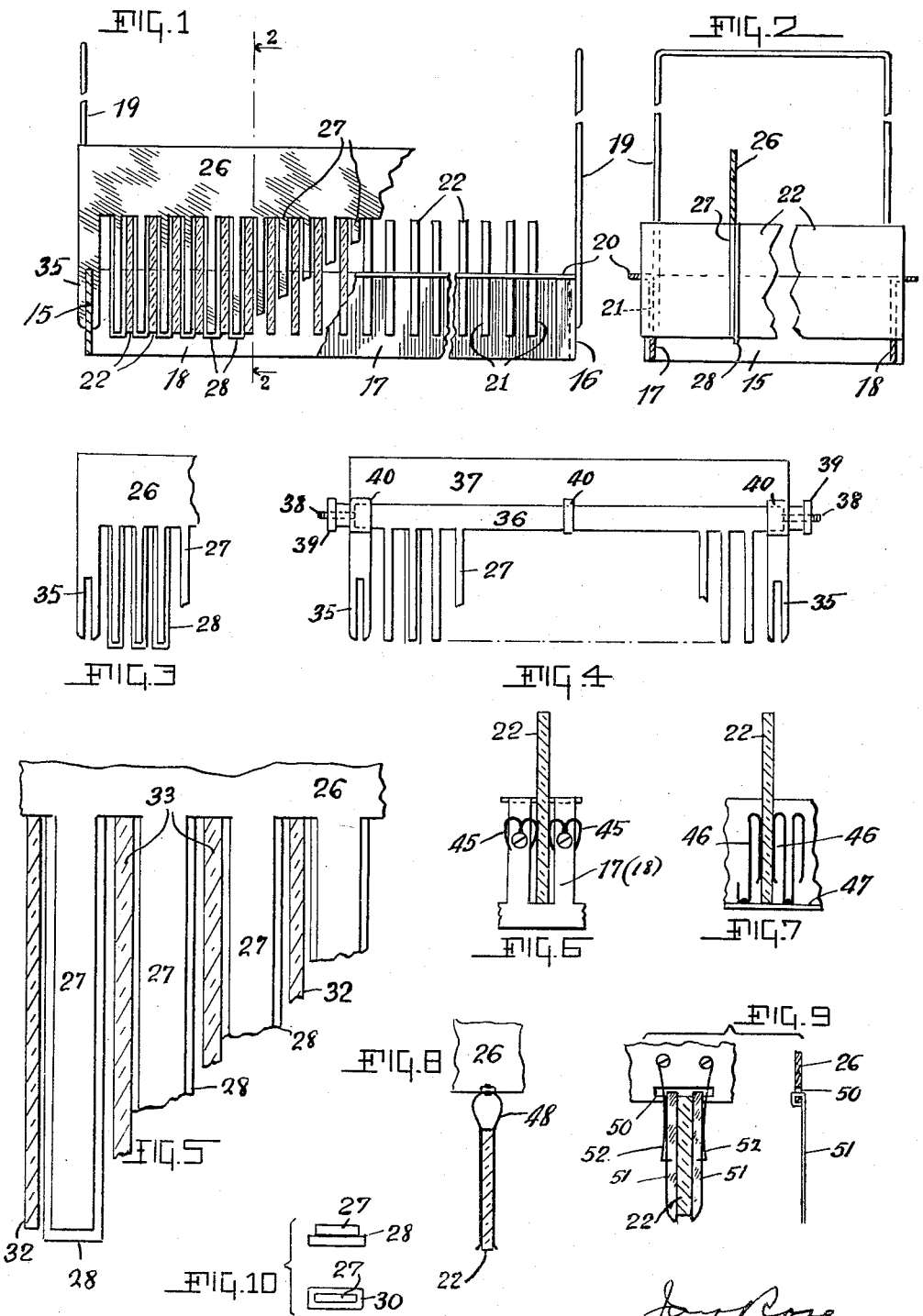

United States Patent Office 2,696,626
Patented Dec. 14, 1954

2,696,626

APPARATUS FOR CLEANING LABORATORY GLASS SLIDES

Jay Rose, New York, N. Y.

Application April 7, 1952, Serial No. 280,928

5 Claims. (Cl. 15—102)

This invention relates to an apparatus for use in the cleaning of glass slides and more particularly for the cleaning of slides generally used in hospitals and laboratories for microscopic examination of blood etc. The slides are coated with blood, crayon markings, dye stains and immersion oil. After examination the slides are cleaned for reuse. The cleaning process generally employed at present comprises submerging the slides in a detergent solution for softening and disintegrating the matter on the slides and thereafter rubbing the sides and rinsing the slides in running water. They are then placed in a wire container for drying or spread out on a cloth or paper to dry. The slides are piled up in the detergent solution and handled singly in the rubbing and rinsing operation.

A large percentage of the slides are unusable after drying because of spots or clouds on the glass which are not seen while the slides are wet. It is believed that these spots or clouds are caused by blood albumin. When softened into a sludge or slime by the detergent this matter is easily removed by rubbing it off the surface, but when dry it forms a hard film and not removable by ordinary rubbing or wiping. The slime is transferable from one slide to another by the slightest touch. It is obvious therefore that the handling of the slides one by one in the cleaning process is the cause of the resultant high percentage of unclean slides and unless the slide is thoroughly clean it is not usable. Because of the unsatisfactory results many institutions prefer to discard used slides. This is costly since many hospitals use seven to eight hundred slides daily. The present cleaning method is therefore impractical, inefficient, not dependable and costly.

It is the object of my present invention to simplify the cleaning of glass slides, speed the cleaning, lessen the labor and cost and produce slides with maximum clarity.

According to my invention, a plurality of slides are placed in a slide holder having means for spacing the slides apart evenly, in parallel relation, and the holder with slides submerged in a suitable detergent solution for softening and disintegrating the matter on the slides. After a sufficient time, a comb-shaped rubbing or wiping device is used, the teeth or prongs being brought in contact with the sides of the slides and the softened matter rubbed off by the prongs. The holder and slides are thereafter placed in running water for rinsing and then the slides are left in the holder for drying. In this way the possibility of spreading the slime from one slide to another, which is the case when the slides are handled one by one, is eliminated.

While the slides are uniform in width and length they vary in thickness and rubbing the sides of a plurality of slides simultaneously without breakage of the thin glass is the problem which this invention solves. Though the variation in thickness may be but a few thousandths of an inch the problem is the same.

For clear understanding of the invention reference should be had to the accompanying drawing in which, Fig. 1, is a side view of the apparatus, partly in section and parts broken away.

Fig. 2, is a transverse sectional view on the plane 2—2 of Fig. 1, and partly an end view.

Fig. 3, is a detail view of parts of the slide rubbing tool.

Fig. 4, is a detail view of a modification showing the prongs being adjustably mounted on the main handle of the rubbing device.

Fig. 5, is an enlarged detail view of slides and wiping prongs.

Figs. 6 and 7 show modifications of slide holding means.

Figs. 8 and 9 show modified prongs.

Fig. 10, is an end view of the cleaning prongs.

The slides are placed in a slide holder which is in the form of a rectangular frame, open at the top and at the bottom. The frame consists of two ends 15 and 16 and two sides 17 and 18. Each side has an outwardly projecting flange 20 and is provided with as many slots 21 as the size of the holder calls for. The slots are evenly spaced as shown and serve to receive and support the glass slides 22. The latter are held in the slots in parallel spaced relation with the ends of the slides in alignment.

The holder with the slides may be carried about by means of the handles 19 and moved from place to place, submerged or dipped into solutions for cleaning and rinsing and set aside for drying.

The glass slides are cleaned by means of a comb-shaped device consisting of a handle 26 with downwardly projecting prongs 27 to which a rubber wiper 28 is secured by any suitable means. As shown in Fig. 10 the prongs may have a rubber tube or envelope 30 to serve as a rubbing element.

Fig. 5, is an enlarged view of glass slides and cleaning prongs. As pointed out above the slides vary in thickness, and this figure shows two thinner slides 32, 32 and two thicker slides 33, 33. Two prongs are in contact with the sides of two slides 33 and two other slides 32 being thinner are not contacted by the rubber. It is not to be assumed from this view that there are only two thicknesses in a batch of slides. In fifty slides the variation may be general, from one to five thousands of an inch.

The need for resilient sides on the rigid prongs is now apparent. The side movement of the slides being limited and the slides varying in thickness, pressure on the prongs against the sides of the slides to reach a plurality of slides for simultaneously rubbing them to remove the softened matter would break all slides thicker than the thinnest if the prongs were without resilient, pliable means. The prongs being evenly spaced apart and the rubber being of the same width and extending uniformly beyond the sides of the prongs, and having suitable resiliency and pliancy, and the spaces between the slides in the holder being interrelated with the spaces between the prongs for uniform positioning of the prongs against the sides of the slides, all sides of the slides will be contacted by the prongs. The rubber is compressed against the sides until the thinnest slide is reached, the compression of the rubber being caused by pressure of the handle against the sides; the variation of the slide thickness being slight and the rubber being suitably resilient and pliable, the pressure on the handle need only be slight and all sides of the slides may be rubbed by the prongs without breakage of the glass. It is understood that the pressure on the handle against the sides is maintained during the rubbing, the movement of the handle back and forth between the slides. The width of the prong may be less than the width of the space between the slides for easy insertion of the prong between the slides. The handle is pressed to the left and to the right for rubbing both sides of the slides. The rubber may extend a greater distance beyond the sides of the prongs for rubbing the sides of the slides facing each other at the same time. This would necessitate pushing the prongs into the spaces between the slides and because of the gripping action of the rubber against the sides, the slides would be pulled out of the holder when the prongs are withdrawn. This is prevented by placing any suitable means over the slides and pressing down on them as the prongs are withdrawn. The wider prongs and the means for holding the slides in place are not shown in the drawing. The slide holder, handle and prongs may be made of stamped metal or other suitable material. The handle and prongs may be molded of a hard rubber and the sides of the prongs tapered down to a thin edge having suitable resiliency.

The handle 26 with the prongs 27 is guided in its cleaning and rubbing movement parallel to and between the slides by means of the slotted projections 35 which ride on the edges of the ends 15 and 16 of the slide holder.

Fig. 4 is a view of a device for holding the prongs in position against the sides of the slides after the prongs are adjusted. The device comprises a narrow handle 36 for the prongs, this handle being slidably secured to a wider handle 37. The end portions of the narrow handle have threaded studs 38. When nuts 39 are turned over the threaded studs on the narrow handle, the latter and the prongs move in the direction desired. Clips 40 on the handle 37 support the narrow handle 36. After the prongs are brought in position against the sides of the slides, no side pressure is required on the handle when moved back and forth between the slides for rubbing action by the prongs, the slotted end portions at 35 of the wide handle being guided as explained above. After the rubbing is done, the nuts are loosened to release the pressure of the prongs against the sides of the slides.

Figs. 6 and 7 illustrate modified means for controlling the side movement of the slides in their supporting means. In Fig. 6, the slide 22 is held between springs 45 secured to the sides of the frames 17 and 18. In Fig. 7, the slide is held between spring clips 46 mounted upon a flange 47 which extends inwardly from the sides 17 and 18.

Figs. 8 and 9, show modified prongs, for cleaning or rubbing both sides of a slide at the same time. Fig. 8, shows a spring clip, the sides or prongs being expanded and over the sides of a slide. The clip 48 is secured to the handle 26 by any suitable means.

In Fig. 9, the handle is provided with slots 50 in which slide rubbing prongs 51 may move latterly to grip and rub the slide between them. Springs as 52 keep the prongs in rubbing engagement with the slides.

The forms of the invention shown and described herein are to be considered merely as representative. It will be apparent to those skilled in the art that numerous modifications may be made therein without departing from the spirit and principles of the invention or the scope of the appended claims.

I claim:
1. An apparatus for cleaning glass slides of the character described comprising a rectangular frame having means in the opposite sides thereof for receiving and supporting a plurality of said slides in uniform spaced relation and resilient means for controlling the side movement of said slides, the said means being secured to the sides of said slide holding frame, and means for limiting the lengthwise movement of said slides in said frame; a slide cleaner consisting of a handle and cleaning prongs projecting from said handle, said prongs spaced for movement between and along said slides in the said frame for contacting the sides of said slides to clean the same as the said cleaner is moved manually along said sides with the said prongs extending between the slides, the said frame being open at the top and at the bottom and handles secured to the ends of said frame.

2. An apparatus for removing softened matter on laboratory glass slides comprising a holder having means for supporting a plurality of said slides in uniform spaced relation, the sides of said slides facing each other; means for limiting the side movement and the lengthwise movement of the slides within said holder, said slides being of uniform length and width and the spaces between said slides being unobstructed; a wiper comprising a handle and prongs extending from said handle, said prongs being evenly spaced apart, rigid, of suitable length and having resilient, pliable means for contact with the sides of said slides for rubbing action against said sides and to prevent breakage of said slides from said rubbing action; the width of said spaces between said slides being interrelated with the width of said prongs and the angle of said slides in said holder corresponding to the angle of said prongs for uniform positioning of said prongs with said slides for said rubbing action.

3. An apparatus according to claim 2 in which the said prongs are in contact with sides of adjacent slides at one time.

4. An apparatus according to claim 2 including means for guiding said prongs in a straight line between said slides.

5. An apparatus according to claim 2 including means for moving said prongs sidewise and holding said prongs against said slides.

References Cited in the file of this patent

UNITED STATES PATENTS

| Number | Name | Date |
|---|---|---|
| 2,334,651 | Schafer | Nov. 16, 1943 |
| 2,604,199 | Govan | July 22, 1952 |